United States Patent [19]

Yamashita

[11] 4,105,577
[45] Aug. 8, 1978

[54] FILTER GLASS

[75] Inventor: Toshiharu Yamashita, Hachioji, Japan

[73] Assignee: Hoya Corporation, Tokyo, Japan

[21] Appl. No.: 856,895

[22] Filed: Dec. 2, 1977

[30] Foreign Application Priority Data

Dec. 2, 1976 [JP] Japan .................. 51/145150

[51] Int. Cl.² .......................... C03C 3/16; C03C 3/30; F21V 9/08; G02B 5/22
[52] U.S. Cl. ............... 252/300; 106/47 R; 106/47 Q
[58] Field of Search ............ 252/300 G; 106/47 R, 106/47 Q

[56] References Cited

U.S. PATENT DOCUMENTS

| | | | |
|---|---|---|---|
| 3,751,272 | 8/1973 | Izumitani et al. | 106/47 Q |
| 3,785,835 | 1/1974 | Izumitani et al. | 106/47 Q |
| 3,798,041 | 3/1974 | Izumitani et al. | 106/47 Q |
| 3,923,527 | 12/1975 | Matsumura et al. | 106/47 Q |

*Primary Examiner*—O. R. Vertiz
*Assistant Examiner*—Mark Bell
*Attorney, Agent, or Firm*—Sughrue, Rothwell, Mion, Zinn and Macpeak

[57] ABSTRACT

A yellow colored filter glass comprising
(a) 100 parts by weight of a base glass consisting of, by weight, 65 to 85% of $P_2O_5$; 3 to 10% of $Al_2O_3$; 0 to 18% of MgO, 0 to 25% of CaO, 0 to 30% of ZnO, with the total proportion of MgO + CaO + ZnO being 10 to 30%; 0 to 15% of SrO and/or BaO; 0 to 10% of PbO; 0 to 10% of at least one of $Li_2O$, $Na_2O$ and $K_2O$; and 0 to 5% of $B_2O_3$, $ZrO_2$, $TiO_2$ or $La_2O_3$;
(b) 0.01 to 1.0 part by weight of NiO; and
(c) 0 to 2.0 parts by weight of CuO.

1 Claim, 2 Drawing Figures

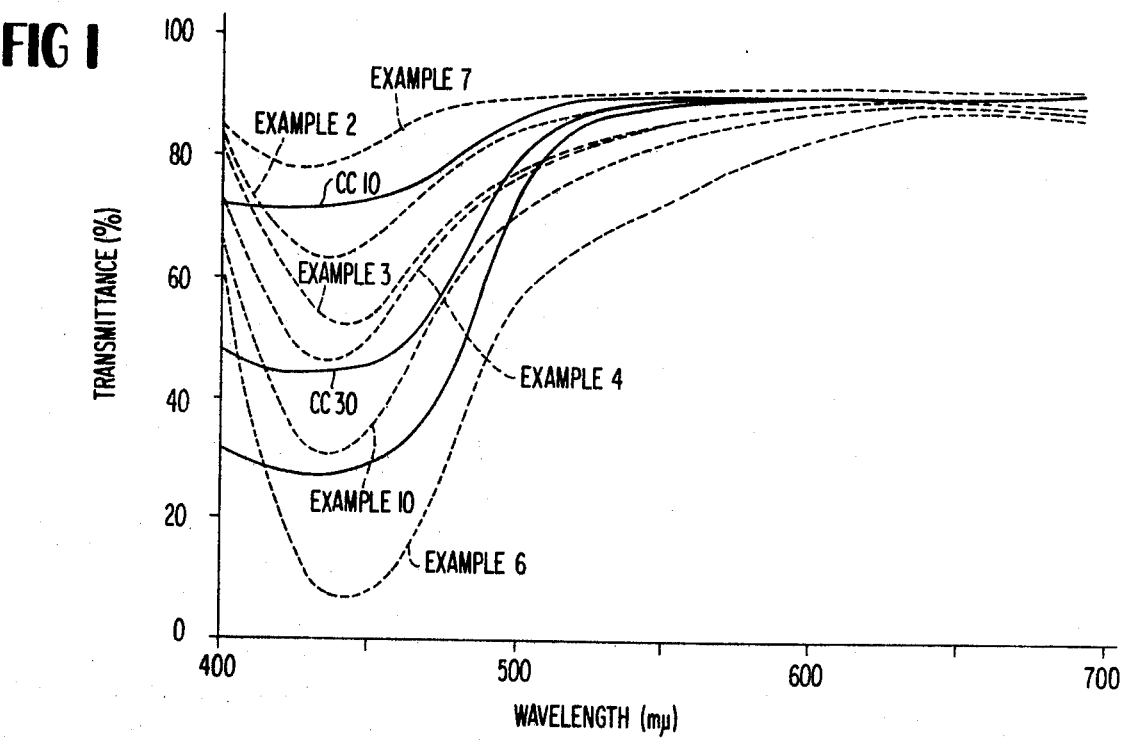
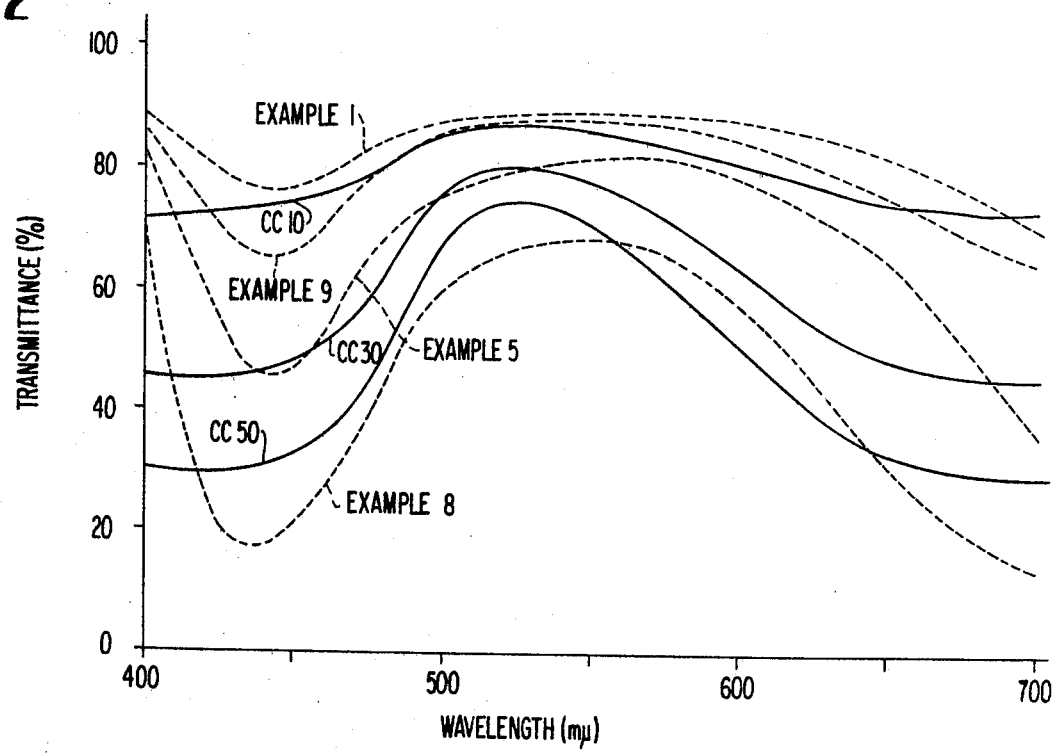

FILTER GLASS

BACKGROUND OF THE INVENTION

1. Field of the Invention

This invention relates to a color-correcting filter glass which selectively absorbs light of wavelengths in the range of about 400 about 500 m$\mu$ and light of wavelengths both in the range of about 400 to about 500 m$\mu$ and in the range of about 600 to about 700 m$\mu$.

2. Description of the Prior Art

In color printing, gelatin films which selectively absorb the wavelength of blue, red, green and yellow light, etc. have been used heretofore as color-correcting filters. Gelatin films have the advantage that they are inexpensive, and can be relatively easily dyed to produce filters of various colors.

But since they are susceptible to degeneration or discoloration during use, they must be exchanged within relatively short peiods of time in order to always obtain prints in a stable manner. Hence, gelatin filters are not suitable for incorporation in devices with complicated mechanisms in which exchange is difficult.

On the other hand, conventional colored glasses are unsuitable for color correction because they have inferior light absorption characteristics to gelatin filters despite their color tones being similar to those of gelatin filters. An example of such colored glasses is a yellow glass based on a Ag colloid. Since this yellow glass must be melted under reducing conditions, it is difficult to obtain a glass which is free from bubbles and striae and which has a uniform color, and also adverse effects occur with such a glass due to scattering of light. It is known that a metaphosphate glass containing nickel has a yellow color. However, a metaphosphate glass is not practical because of its extremely poor chemical resistance.

SUMMARY OF THE INVENTION

An object of this invention is to provide a glass filter which has light absorption characteristics close to those of a gelatin filter and which does not have the disadvantages of a gelatin filter. The present invention is based on the discovery that the above described object can be achieved by selecting a $P_2O_5$—$Al_2O_3$—MgO, CaO and/or ZnO system as a base glass and further using this system within a limited compositional range.

A detailed study of the relationship between the light absorption characteristics and composition of a glass containing nickel ion was made. This study led to the discovery described in copending U.S. patent application Ser. No. 826,896 filed Dec. 12, 1977 (corresponding to Japanese patent application No. 51-145151) filed simultaneously herewith, that the absorption of the nickel ion changes with the type of the glass network modifier, e.g., an alkali metal oxide such as $Li_2O$, $Na_2O$ or $K_2O$; an alkaline earth metal oxide such as MgO, CaO, SrO or BaO; ZnO or PbO, and components other than MgO, CaO and ZnO cause light absorptions in the wavelength range of about 600 to about 700 m$\mu$ in addition to light absorptions in the wavelength range of about 400 to about 500 m$\mu$ and permit an absorption of red light as well as blue light, but such a glass is unsuitable as a filter for absorbing only blue light.

On the basis of the above fact, the present invention makes it possible to obtain a yellow-colored color-correcting filter glass which selectively absorbs light of wavelengths in the range of about 400 to about 500 m$\mu$ by adding NiO to the $P_2O_5$—$Al_2O_3$—MgO, CaO and/or ZnO base glass, and also to obtain a green-colored color-correcting filter glass which absorbs light of wavelengths in the range of about 400 to about 500 m$\mu$ and about 600 to about 700 m$\mu$ simultaneously by incorporating both NiO and CuO into the glass.

Accordingly, the present invention provides a filter glass comprising (a) 100 parts by weight of a base glass consisting of, by weight, 65 to 85% of $P_2O_5$, 3 to 10% of $Al_2O_3$, 0 to 18% of MgO, 0 to 25% of CaO, 0 to 30% of ZnO, 10 to 30% of MgO + CaO + ZnO 0 to 15% of SrO and/or BaO, 0 to 10% of PbO, 0 to 10% of, at least one of $Li_2O$, $Na_2O$ and $K_2O$ (hereinafter $R_2O$) and 0 to 5% of $B_2O_3$, $ZrO_2$, $TiO_2$ or $La_2O_3$;

(b) 0.01 to 1.0 part by weight of NiO; and (c) 0 to 2.0 parts by weight of CuO.

BRIEF DESCRIPTION OF THE DRAWINGS

FIGS. 1 and 2 show transmission curves of glasses of Examples of this invention and those of commercially available gelatin filters.

DETAILED DESCRIPTION OF THE INVENTION

If the proportion of $P_2O_5$, and MgO + CaO + ZnO are outside the ranges of 65 to 85% and 10 to 30%, and the proportions of MgO, CaO and ZnO are more than 18%, 25% and 30% respectively, stable glasses having reduced tendency to devitrification of the glass cannot be obtained.

$Al_2O_3$ is introduced to increase the chemical resistance of the glass. If the amount of $Al_2O_3$ is less than 3%, the glass has poor chemical resistance and cannot withstand use. If the amount of $Al_2O_3$ is more than 10%, devitrification of the glass tends to occur.

SrO and/or BaO, PbO, and at least one alkali metal oxide ($R_2O$) can be added in an amount of up to 15%, up to 10% and up to 10% respectively.

$B_2O_3$, $ZrO_2$, $TiO_2$ or $La_2O_3$ is effective for increasing the chemical resistance of the glass. If the amount thereof exceeds 5%, an increased tendency toward devitrification of the glass occurs.

From the standpoint of the density of coloration, suitable amounts of NiO and CuO are 0.01 to 1.0 part by weight and up to 2.0 parts by weight respectively, based on 100 parts by weight of the base glass. If the amounts are outside of these ranges, the glasses obtained are not suitable for the intended use.

Some specific examples of the glass of this invention (compositions are in weight percent) are tabulated below. However, the present invention is not to be construed as being limited to these examples.

| Component | Example No. | | | | | | | | | |
|---|---|---|---|---|---|---|---|---|---|---|
| | 1 | 2 | 3 | 4 | 5 | 6 | 7 | 8 | 9 | 10 |
| $P_2O_5$ | 78.7 | 74.0 | 67.5 | 72.2 | 68.4 | 83.3 | 73.3 | 74.8 | 71.4 | 69.3 |
| $Al_2O_3$ | 5.1 | 4.8 | 4.4 | 4.7 | 4.5 | 4.0 | 5.6 | 6.5 | 8.9 | 4.7 |
| MgO | 16.2 | — | — | 2.5 | — | — | — | 4.7 | 4.5 | — |
| CaO | — | 21.2 | — | 15.6 | 5.0 | — | — | — | — | 15.4 |
| ZnO | — | — | 28.1 | 5.0 | 21.6 | 12.7 | 16.4 | 14.0 | 8.0 | — |

-continued

| Component | Example No. | | | | | | | | | |
|---|---|---|---|---|---|---|---|---|---|---|
| | 1 | 2 | 3 | 4 | 5 | 6 | 7 | 8 | 9 | 10 |
| SrO | — | — | — | — | — | — | — | — | 2.4 | — |
| BaO | — | — | — | — | — | — | — | — | 3.0 | — |
| PbO | — | — | — | — | — | — | — | — | — | 2.0 |
| $Li_2O$ | — | — | — | — | — | — | 3.7 | — | — | — |
| $Na_2O$ | — | — | — | — | — | — | — | — | — | — |
| $K_2O$ | — | — | — | — | — | — | — | — | — | 6.6 |
| $B_2O_3$ | — | — | — | — | — | — | 1.0 | — | — | — |
| $ZrO_2$ | — | — | — | — | — | — | — | — | 1.8 | — |
| $TiO_2$ | — | — | — | — | 0.5 | — | — | — | — | — |
| $La_2O_3$ | — | — | — | — | — | — | — | — | — | 2.0 |
| NiO | 0.03 | 0.10 | 0.10 | 0.2 | 0.13 | 0.3 | 0.07 | 0.28 | 0.06 | 0.30 |
| CuO | 0.09 | — | — | — | 0.31 | — | — | 0.90 | 0.17 | — |

The transmittance curves of glasses with a thickness of 2 mm which were obtained from the above compositions along with those of commercially available gelatin filters CC10, CC30 and CC50 (e.g., as disclosed in *Kodak Filters for Scientific and Technical Uses*, 1st Edition, Eastman Kodak Company (1970)) are shown in FIGS. 1 and 2.

FIG. 1 shows transmittance curves of yellow glasses containing only NiO. These glasses have absorption peaks in the wavelength range of 430 to 440 m$\mu$, and scarcely any absorption outside this range. Hence, they are suitable for color correction.

FIG. 2 shows the transmittance curves of green glasses containing both NiO and CuO. These glasses are suitable for simultaneously correcting green light and red light. By adjusting the amounts of NiO, or the amount of both NiO and CuO, color-correcting glasses of various color densities can be easily obtained.

The glass in accordance with this invention can be obtained by mixing an orthophosphoric or metaphosphoric acid salt and conventional glass-forming materials, melting the mixture in a ceramic or platinum melter at about 1200° to about 1350° C, stirring and clarifying the melt, and either casting the melt into a mold or cooling the melt while it remains in the melter. Suitable starting raw materials which can be used for the glass of this invention are:

for the $P_2O_5$ component: $H_3PO_4$, $M^+PO_3$ (where $M^+$ is Li, Na or K), $M^{2+}(PO_3)_2$ (where $M^{2+}$ is Mg, Ca, Sr, Ba, Zn or Pb), $Al(PO_3)_2$, etc;

for the $Al_2O_3$ component: $Al_2O_3$, $Al(OH)_3$, etc;

for the $M^+_2O$ component: $CO_3$ or $NO_3$ salts, $M^+PO_3$, etc., where $M^+$ is as defined above;

for the $M^{2+}O$ component: $CO_3$, $NO_3$ or oxides, etc., where $M^{2+}$ is as defined above;

for the NiO component: NiO, $Ni(NO_3)_2$, etc.;

for the CuO component: CuO, etc.

While the invention has been described in detail and with reference to specific embodiments thereof, it will be apparent to one skilled in the art that various changes and modifications can be made therein without departing from the spirit and the scope thereof.

What is claimed is:

1. A filter glass which absorbs light of wavelengths in the range of about 400 to about 500 m$\mu$ when NiO is present alone and which additionally absorbs light of wavelengths in the range of about 400 to about 500 m$\mu$ and about 600 to about 700 m$\mu$ when both NiO and CuO are present, consisting essentially of (a) 100 parts by weight of a base glass consisting of, by weight, 65 to 85% of $P_2O_5$; 3 to 10% of $Al_2O_3$; 0 to 18% of MgO, 0 to 25% of CaO, 0 to 30% of ZnO, with the total proportion of MgO + CaO + ZnO being 10 to 30%; 0 to 15% of SrO and/or BaO; 0 to 10% of PbO; 0 to 10% of at least one of $Li_2O$, $Na_2O$ and $K_2O$; and 0 to 5% of $B_2O_3$, $ZrO_2$, $TiO_2$ or $La_2O_3$;

(b) 0.01 to 1.0 part by weight of NiO; and (c) 0 to 2.0 parts by weight of CuO.

* * * * *